Patented Feb. 13, 1940

2,189,824

UNITED STATES PATENT OFFICE 2,189,824

METHOD OF MANUFACTURING DRIED STARCH CONVERSION PRODUCTS

James F. Walsh, Chicago, Ill., assignor to American Maize-Products Company, a corporation of Maine No Drawing. Application August 25, 1938, Serial No. 226,681

10 Claims. (Cl. 127—34)

This invention relates to starch conversion products and more particularly to a substantially dry, light colored, solidified, corn syrup product which may be stored without lumping or caking, and to method of manufacturing this product. This application is a continuation in part of my application Serial No. 163,257 filed September 10, 1937.

For many years there has been a desire in the corn products industry to produce a dry, solid product from corn syrup, in the form commonly known as glucose, that on storage would remain as a stable, solid material, not lumping or sticking together. Such a product would be easily handleable and could be conveniently packaged in cardboard boxes, paper containers, sacks, etc. Due to the relatively light weight of the dry product and that of the suitable containers as compared with the heavy liquid corn syrup and its usual metal containers, it could be shipped economically. Another recognized advantage of a solid dried corn syrup is that it would contain dextrose in readily assimilable form and therefore would be a desirable constituent in certain foods, particularly infant food; also it would be useful as a filler and nutritive material for ice cream, confections and bakery products.

In view of the recognized advantages and wide potential uses of a solid, dehydrated, corn syrup product numerous attempts have been made heretofore to dry corn syrup to a solid form. However, none of these attempts has been successful in producing a commercially satisfactory product; the principal difficulty being the strong hygroscopic properties of the corn syrup which prevent the production of a dry, stable, product. The solid corn syrup products heretofore produced would lump or set to a solid mass in storage or shipment. Some of them were protected by vacuum sealing in cans but once the can was opened to use some of the material, the remainder being very hygroscopic would absorb moisture from the atmosphere very rapidly and revert back to the liquid state or at least change into a sticky mass.

Heretofore, when it was attempted to dehydrate the heavy corn syrup, i. e., glucose, to dried solid form, processing difficulties arose that prohibited the production of a commercially satisfactory product. The usual prior art method involved prolonged heating of a large mass of the syrup, which is difficult to circulate or agitate, whereby overheating of the syrup adjacent the heating coils took place and accordingly the overheated portions of the syrup became discolored. This undesirable result was encountered especially where the vacuum pan in which the syrup was heated contained any appreciable depth of the syrup, since the hydrostatic head of such syrup actually increases its boiling point over and above that which would normally prevail under the vacuum used. These difficulties made it practically impossible to dehydrate glucose to the necessary degree without serious caramelization and discoloration. Because of this difficulty the corn syrup could not be dehydrated, without damage, to a moisture content much lower than the equilibrium moisture content produced on exposure to the atmosphere and which varies from about 8% to 13%. The solidified corn syrup having such amounts of moisture would not remain stable, that is, they would cake and liquefy easily.

Another difficulty present in the prior art processes is in the cooling of the partially dehydrated syrup to a point below its plastic flow temperature, that is, to effect solidification so that the product may be pulverized or powdered. Heretofore, this cooling has been done generally by pouring the hot, cooked syrup into metal trays about 6 inches deep, 24 inches wide and 48 inches long. This size mass of syrup particularly because of the thickness, retains the dehydration heat, which prohibits quick cooling and makes it necessary for the mass to set in the trays for a period of about 8 to 24 hours, until the mass will lend itself to grinding without congealing. The disadvantage of this prolonged cooling period is that considerable color and undesired taste develop in the material, which is objectionable in the final product.

Furthermore, when the solidified mass is ready to be ground considerable labor is required for breaking the mass and removing all of it from the trays for grinding. The grinding operation, heretofore, has been carried out under usual atmospheric conditions and the partially dehydrated material, still being hygroscopic, absorbs an appreciable amount of moisture from the air during grinding, thereby rendering it more unstable.

In accordance with the present invention, new method and means are employed for overcoming all of the above mentioned difficulties characteristic of the prior processes and accordingly a commercially satisfactory, substantially dry, stable, solid, syrup product has been produced. This desired but heretofore unobtained result is accomplished mainly by the following improved procedures:

1. The corn syrup is dehydrated, preferably under vacuum, to a low stabilizing moisture content, that is, not greater than about 4% and preferably in the order of about 1% to 3% moisture. To prevent discoloration of the dehydrated syrup either one or two procedures or a combination of these procedures may be used, as follows:

(a) The syrup may be dehydrated in a plurality of small batches, using a series of small cookers or dehydration vessels whereby the tendency to caramelization, characteristic of large batches as explained above, is reduced to a minimum; and the output of dehydrated syrup from these cookers to the chilling medium, described below, is regulated so as to obtain maximum heat transfer in cooling with minimum discoloration.

(b) The syrup may be dehydrated in a relatively large single batch or batches and sulphur dioxide or a sulphur dioxide liberating agent is incorporated in the syrup in relatively large quantities.

The amount of sulphur dioxide used should be not less than about .01% by weight of the syrup undergoing dehydration. A satisfactory range of sulphur dioxide percentage is approximately .01% to .03% and a presently preferred amount is 0.02%. The necessary amount of sulphur dioxide will vary with different syrups, and with different dehydration conditions. In general, an amount of sulphur dioxide sufficient to prevent caramelization of the syrup when dehydrated to a moisture content of about 1% to 3% should be used.

(c) A combination of the procedures (a) and (b) above described may be used although a combination of their effects is not essential to the production of a satisfactory product. If desired, the syrup may be dehydrated in relatively small batches and the sulphur dioxide or sulphur dioxide liberating agent may be incorporated to insure against any slight discoloration. The amounts of decolorizing agent used in this case will be proportionate to those stated above for the large batch process.

2. It is advantageous to maintain the corn syrup definitely acid during the dehydration treatment, for example at a pH value of about 3.5 to 5.5 and preferably at a pH value of about 4 to 5.2.

3. After the dehydration treatment the syrup is quickly cooled to solidification by depositing it upon a chilled surface in the form of a relatively thin sheet or film, thereby avoiding protracted cooling with the usual consequent discoloration and undesirable taste. This sheeting process is advantageously a continuous operation and the sheets or films not more than about 1 inch in thickness, preferably between about ⅛ inch and 1 inch in thickness. This quick cooling in thin sheet form is carried out in a humidity controlled atmosphere such that the material will not absorb during cooling any appreciable amount of moisture. The chilling surface may be in the form of a large roll, thin metal belt, or screen, operated at a suitable low temperature for solidifying the hot syrup.

4. The chilled and solidified syrup product is subjected to a grinding and screening operation in a humidity controlled atmosphere to prevent moisture absorption by the dried product which after screening to size, is packaged in a humidity controlled atmosphere.

It is to be understood that the above outlined processing conditions are desirable, but that the invention is not strictly limited thereto; reasonable variations and omissions are entirely feasible and satisfactory results still obtained. For example, when a water-white product is desired it is advantageous to use the relatively large amount of sulphur dioxide or sulphur dioxide liberating agent during the concentration of the glucose syrup to a very low moisture content. The sulphur dioxide liberating agent may be an alkaline bisulphite such as for example sodium potassium or ammonium bisulphite. The large amount of sulphur dioxide, such as 0.02%, functions to prevent discoloration of the syrup normally encountered by the intensive and prolonged heat treatment during concentration. The small amounts of sulphur dioxide heretofore used for other purposes would not be adequate. If a dark colored product is desired or permissible the single batch process could be used and some or all of the sulphur dioxide omitted. If this is done caramelization of the syrup during heating will take place and a colored product ranging from light amber color to dark brown will result. However, whether a dark, light or colorless product is produced, the dehydration to a low stabilizing moisture content will be carried out.

If a bisulphite, such as sodium bisulphite, is used as the sulphur dioxide liberating agent, it should be used in an amount of about .016% to .049% as $NaHSO_3$ (or approximately 0.02% to 0.05%) by weight of the starch conversion syrup. During the latter stages of this concentration an acid is added to compensate for the increased alkalinity caused by decomposition of the bisulphite. After this treatment the residue of sulphur dioxide remaining in the syrup is only about 0.005% by weight of the final solidified product. Suitable examples of the acids used for the above purposes are acetic, tartaric, sulphuric and hydrochloric acids. Other inorganic and organic acids of similar characteristics may be used. The precaution to be taken in selecting suitable sulphur dioxide liberating materials and suitable acids to effect the desired acidity of the syrup is that any products of their reaction, which remain in the dried syrup product, will not be harmful to the edible or other properties of the products.

The extent to which the corn syrup or other starch conversion syrup must be dehydrated to obtain a suitable low moisture content is dependent largely upon the degree of conversion or dextrose equivalent of the syrup. The higher the dextrose equivalent the lower is the maximum allowable moisture content. For example, to produce a stable product from a starch conversion syrup of about 55% to 60% dextrose equivalent it is necessary to reduce the moisture content to approximately 1% to 1½. In the case of a medium dextrose equivalent product, such as glucose which has a reducing value of about 42% dextrose equivalent, it is necessary to reduce the moisture content to about 2% to 3%, and for lower dextrose equivalent syrups, such as "Lodex" which is a starch conversion syrup having a dextrose equivalent of about 31%, and a relatively high dextrin content, the maximum allowable moisture is from about 3% to 4%. The allowable moisture content is that amount of moisture which the dehydrated and solidified syrup can retain and still have a sufficiently high congealing or plastic flow temperature characteristic to prevent caking or lumping of the product when exposed to the atmosphere for a reasonable length of time.

In practice it is desirable to dehydrate the corn syrup product down to a moisture content of about 3% or below, since such products show a minimum of plastic flow at temperatures up to 120° F. When the moisture content is appreciably above this relatively low percentage, say for example, above 4%, the solid sugars produced will show a slow plastic flow at ordinary room temperatures upon standing and will gradually become stuck together to form a solid cohesive mass. In the usual case it is practically not worth while to reduce the moisture content below about 1% to 1½% since below this percentage no appreciable advantage is obtaintd from the standpoint of storability, and the possibiliies of discoloring the product are greatly increased.

The usual procedure for producing a converted corn syrup, suitable for use in this invention, is to subject a corn starch-water suspension to the action of heat, pressure and a starch conversion acid such as hydrochloric acid. By this treatment the starch is converted into a mixture of dextrins and reducing sugars, namely, maltose and dextrose, the amount of reducing sugars formed under standard conditions being dependent upon the length of time employed for the conversion reaction. The resulting conversion liquor is neutralized, filtered, bleached and concentrated to a heavy syrup of the desired Baumé, according to known processes. This type of syrup forms the starting material for this invention.

In accordance with the general process of the present invention the above described starch conversion syrup is first dehydrated to a moisture content well below its normal equilibrium moisture content. That is, the residual moisture content is in the range of about 1% to 4% instead of the usual equilibrium moisture content of about 8% to 13%. Accordingly when the dehydrated syrup is processed, such as in the subsequent cooling and grinding operations, it has a tendency to regain some of its normal moisture content. If, for example, the cooling or grinding operations are carried out in the presence of ordinary air having natural atmospheric moisture content, the dehydrated syrup having a moisture content of 1% to 4%, will pick up about ½% to 1% moisture. This moisture pick-up is an important factor, especially in the summer months, since a small increase in the moisture content of the product produces a large decrease in the congealing or plastic flow temperature. Under hot weather conditions and with a moisture content of about 4% an increase of ½% in the moisture content of the dehydrated and solidified product is sufficient to change a satisfactory product into an unsatisfactory product. These possible difficulties are avoided in the present invention by carrying out the cooling and grinding operations in a moisture controlled atmosphere having not more than about 50 grains of moisture per pound of dry air. A satisfactory range of moisture content for the surrounding air is about 10 to 50 grains of moisture per pound of dry air.

In the cooling operation which is carried out to effect solidification of the syrup, the syrup may be solidified by depositing on a suitable chilled surface, described hereinabove, in the form of a thin layer or sheet; or it may be extruded as filaments or threads. The deposited or extruded material is advantageously passed slowly through a temperature and humidity controlled air zone. For example, a sheet of the dehydrated syrup approximately ¼ inch in thickness will solidify in 15 minutes at an atmospheric temperature of about 70° F., the humidity of the air being controlled as described hereinabove. Under similar conditions a sheet ⅝ inch in thickness will require approximately 25 minutes to solidify. When the chilling surface is in the form of a rotating roll or moving belt or screen, these surfaces are maintained at the proper temperature by any suitable means, such as temperature controlled water applied directly or indirectly to the chilling surface.

In accordance with one illustrative but non-limiting embodiment of this invention, a substantially dry, storable syrup product having a relatively light color and being stable against caking and lumping over reasonably long periods of time may be prepared as follows:

To a batch containing 1600 to 1700 pounds of actual sugar solids in a 30° to 42° Baumé corn syrup solution, is added 300 cc. of sodium bisulphite solution containing 31% sulphur dioxide. The mixture is then carefully gradually cooked down until its moisture content is below about 4% and preferably below 3%. This can be done in any desired type of equipment, but is preferably carried out with stirring in a vacuum pan or a series of pans. If desired, the first part of the concentration may be carried out in a pan or pans to a point where the moisture content is in the order of 6% to 7%, and then rapidly effecting the final drying by pouring the syrup in the form of thin films on a heated drum or similar hot surface. This procedure for the final dehydration is not necessary, however, since the entire dehydration process may be carried out in the vacuum pans. Toward the end of the concentration treatment in the vacuum pan or pans 500 cc. of 36% acetic acid is added to the syrup and the mixture stirred. This acid apparently reacts with any remaining sodium bisulphite, which has not decomposed, and forms sodium acetate and gaseous sulphur dioxide. The latter is removed by the heat applied during the last stages of concentration of the syrup. In this manner only a small amount of harmless sodium acetate remains in the final sugar product and the excess sulphur dioxide is removed down to a point where that remaining does not affect the edible properties of the final product. The acid, as above explained, neutralizes the alkalinity caused by the sodium bisulphite and its decomposition and gives the syrup an acid pH which is conducive to clarity of the syrup.

After having dehydrated the syrup as above described to the desired low moisture content the resulting heavy sugar syrup is spun out onto chilled tables, chilled rolls or onto a thin metal belt or screen which is chilled. Whatever the cooling means used, it is advantageous to keep the thickness of the sugar syrup coating very thin, preferably of the order of ¼ inch or less so that very rapid chilling and solidification occurs, whereby undesirable color formation is kept at a minimum.

The dehydrating and chilling processes are preferably so sychronized that the batches of dehydrated syrup will be just sufficient to maintain the cooling operation continuous. By dehydrating the syrup in consecutive small batches, none of the material will be cooked for long periods of time or held at high temperatures for appreciable lengths of time. When this procedure of cooking and cooling is used it is not necessary, as explained above, to use the sulphur dioxide, but it may be used with some advantage in any of the alternative methods where a product having substantially no color is required.

It will be understood that the dried, solid syrup product produced in accordance with the foregoing description may be chipped, melted, granulated or otherwise reduced to the desired physical form. When the product is prepared according to the above described processes and reduced to the desired particle size by screening or otherwise, it can be easily handled and packaged in cloth lined paper bags, similar to other sugars, and will remain substantially in the form of separate particles, that is, it will not lump or cake during storage or shipment for a reasonable period of time. This dried syrup product has been found useful for substantially all purposes for which glucose syrup may be used and for many other purposes for which glucose syrup is not suitable because of its viscous, sticky nature. Furthermore, the solidified product is substantially more economical to handle and ship than the heavy syrup.

The above described process is applicable to syrups having a wide range of dextrose content, generally from a low dextrose content of about 25% up to a dextrose content of about 65%. While the process will work satisfactorily and produce improved results in the high dextrose ranges, it is preferred to use a syrup having a dextrose content of less than about 42% since such syrups are initially less hygroscopic and their dried products are more stable.

In the specification and claims herein the term "relatively light colored" has been used for characterizing the products of this invention so as to distinguish these products from those produced by the prior art processes in which caramelization and other discolorization of the dried products are generally encountered. This term is therefore used to indicate products which have a sufficiently low or light color to be satisfactory for commercial purposes. An example of a satisfactory product from the color standpoint is one whose color comes within the range of about 5 to 10 Brown lovibond scale, series 52 glasses, when observed as a 12% solution in a four ounce oil bottle. Preferably the color is maintained at less than 5, that is, at a minimum. While I do not wish to be limited to this exact range of colors it defines the color characteristic that most commercially satisfactory products should possess.

Except where otherwise specified the term, dextrose, as used in the specification and claims herein is intended to cover both of the reducing sugars, i. e., dextrose and maltose, calculated as dextrose. The percentages or amounts of dextrose, or reducing sugars, as described herein, are calculated as anhydrous dextrose on the percent of dry solids. Similarly for sake of brevity and simplicity, the term "sheet" of syrup for solidifying, as used in the specification and claims herein, is used in a generic sense and is intended to include films, threads, filaments, and all other practical forms of the syrup as deposited or extruded onto the chilled surface.

Various modifications and changes may be made in the above described processes, products and materials without departing from the scope of my invention. For example, while corn syrup has been specifically mentioned, it is to be understood that converted starch syrups obtained from other amylaceous materials such as potatoes, beans, peas, etc., may be used.

Some of the novel features of this invention are defined in the appended claims:

I claim:

1. A process of producing a substantially dry, solidified, starch conversion syrup product adapted to be packaged, shipped and stored for a reasonably long length of time without caking or lumping, comprising dehydrating a starch conversion liquor having a dextrose content of about 25% to 65% and a pH value of about 3.5 to 5.5, said dehydration being carried out in the presence of about 0.01% to 0.03% of sulphur dioxide to prevent caramelization of the dehydrated product and being continued until the moisture content of said product is between about 1% and 4%, quickly cooling the dehydrated product in the form of relatively thin sheets and in a humidity controlled atmosphere to effect solidification without caramelization, and comminuting the solidified product in a humidity controlled atmosphere.

2. A process for producing a dried, solidified, storable, starch conversion syrup product without discoloring the product comprising dehydrating an acidic corn syrup, having a pH of about 3.5 to 5.5, a dextrose content of about 25% to 65%, in the presence of about 0.01% to .03% sulphur dioxide sufficient to prevent discoloration, until moisture content of said syrup is less than about 4% and quickly cooling the dehydrated syrup in relatively thin sheets to effect solidification.

3. A process for producing a dried, solidified, storable, starch conversion syrup product without discoloring the product comprising dehydrating an acidic corn syrup, having a pH of about 3.5 to 5.2, a dextrose content of about 25% to 65%, in the presence of about 0.02% to 0.05% sodium bisulphite sufficient to prevent discoloration but insufficient upon decomposition to raise the pH of the acidic corn syrup above a value of 5.5, and continuing said dehydrating of the acidic corn syrup until the moisture content of said syrup is less than about 4% and quickly cooling the dehydrated syrup in relatively thin sheets to effect solidification.

4. A process for producing a dried, solidified, storable, starch conversion syrup product without discoloring the product comprising heating an acidic corn syrup, having a dextrose content of about 25% to 65% and a pH value of about 3.5 to 5.5, in the presence of 0.02% to 0.05% of sodium bisulphite sufficient to prevent discoloration, until the moisture content of said syrup is slightly less than about 6%, adding acetic acid to compensate for the increase in alkalinity caused by decomposition of said sodium bisulphite, further dehydrating said syrup until the moisture content is less than about 4%, and quickly cooling the dehydrated syrup in relatively thin sheets to effect solidification.

5. A process for producing a dried, solidified, storable, starch conversion syrup product without discoloring the product comprising heating an acidic corn syrup, having a dextrose content of about 25% to 65%, and a pH value of about 3.5 to 5.5, in the presence of about 0.02% to 0.05% of an alkali metal bisulphite that decomposes during said heating and liberates sulphur dioxide which prevents discoloration of said syrup, continuing said heating until the moisture content of the syrup is less than about 6%, adding acid to compensate for the increase in alkalinity caused by said bisulphite, continuing heating said syrup until the moisture content is less than 4%, and quickly cooling the dehydrated syrup in relatively thin sheets to effect solidification.

6. In a process of producing a substantially dry, solidified, starch conversion syrup product adapted to be packaged, shipped and stored for a reasonably long length of time without caking or lumping, the improvement of dehydrating the syrup having a pH of about 3.5 to 5.5 and a dextrose content of about 25% to 65% in the presence of about 0.01% to 0.03% sulphur dioxide to reduce the moisture content of the syrup to less than 4% while preventing caramelization of the syrup.

7. In a process of producing a substantially dry, solidified, starch conversion syrup product adapted to be packaged, shipped and stored for a reasonably long length of time without caking or lumping, the improvement of dehydrating the syrup having a pH of about 3.5 to 5.5 and a dextrose content of about 25% to 65% in the presence of about 0.01% to 0.03% sulphur dioxide to reduce the moisture content of the syrup to less than 4% while preventing caramelization of the syrup and chilling said syrup in a humidity controlled atmosphere to effect solidification without appreciable moisture absorption.

8. A process as defined in claim 7, and further characterized by comminuting the solidified product in a humidity controlled atmosphere.

9. In a process of producing a substantially dry solidified starch conversion syrup product adapted to be packaged, shipped and stored for a reasonably long length of time without caking or lumping, the improvement of dehydrating said syrup, having a pH of about 3.5–5.5 and a dextrose content of about 25%–65%, in a plurality of small batches to a moisture content of about 1% to 4% and continuously and quickly cooling the dehydrated syrup from each of said batches in the form of a relatively thin sheet not substantially greater than 1 inch in thickness whereby maximum heat dissipation is effected and a solidified product of minimum color is obtained and synchronizing the dehydrating and cooling operations so that the amount of dehydrated syrup from the several batches is just sufficient to supply the cooling and solidifying operation.

10. A process as defined in claim 9 in which the syrup is corn syrup.

JAMES F. WALSH.